US012602068B2

(12) United States Patent
Zhang et al.

(10) Patent No.: US 12,602,068 B2
(45) Date of Patent: Apr. 14, 2026

(54) SIGNAL PROCESSING DEVICE AND OPERATING METHOD THEREOF

(71) Applicant: Realtek Semiconductor Corporation, Hsinchu (TW)

(72) Inventors: Zhen Cheng Zhang, Hsinchu (TW); Chih-Lung Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 24 days.

(21) Appl. No.: 18/966,164

(22) Filed: Dec. 3, 2024

(65) Prior Publication Data

US 2025/0190001 A1     Jun. 12, 2025

(30) Foreign Application Priority Data

Dec. 7, 2023    (TW) ................................. 112147716

(51) Int. Cl.
 *G05F 1/567*      (2006.01)
 *G05F 1/46*       (2006.01)
 *H04B 1/04*       (2006.01)
(52) U.S. Cl.
 CPC .............. *G05F 1/567* (2013.01); *H04B 1/04* (2013.01); *H04B 2001/0416* (2013.01); *H04B 2001/0491* (2013.01)
(58) Field of Classification Search
 CPC . G05F 1/567; G05F 1/46; G05F 1/565; G05F 1/461; G05F 1/462; G05F 1/468; G05F 3/02; G05F 3/08; G05F 3/222
 USPC .......................... 327/307, 306, 331, 332, 538
 See application file for complete search history.

(56) References Cited

U.S. PATENT DOCUMENTS 12,271,217 B2 *    4/2025   Mahmoodi .............. G11C 7/04

FOREIGN PATENT DOCUMENTS

TW          201136193 A    10/2011

OTHER PUBLICATIONS

Lingwei Zhang et al., Tsinghua National Laboratory for Information Science and Technology Institute of Microelectronics, Tsinghua University, Beijing, 100084, China, "A LUT-free DC Offset Calibration Method for removing the PGA-gain-correlated Offset Residue", 2013 IEEE, pp. 1704-1707.
(Continued)

*Primary Examiner* — Hai L Nguyen
(74) *Attorney, Agent, or Firm* — CKC & Partners Co., LLC

(57) ABSTRACT

A signal processing device includes a circuit system, in which the circuit system includes an amplifier, a temperature compensating circuit and a computing circuit. The amplifier is configured to amplify an input signal according to a temperature compensating current, in order to generate an output signal. A direct current offset of the output signal is related to the temperature compensating current. The temperature compensating circuit includes a detecting resistor and a comparator. The detecting resistor is configured to generate a detecting voltage according to the temperature compensating current. The comparator is configured to compare the detecting voltage with a reference voltage to generate a comparison signal. The computing circuit is configured to adjust the temperature compensating current according to the comparison signal so as to make the detecting voltage approximate to the reference voltage.

18 Claims, 4 Drawing Sheets

(56)                    References Cited

OTHER PUBLICATIONS

Horng-Yuan Shih et al., "A 250 MHz 14 dB-NF 73 dB-Gain 82 dB-DR Analog Baseband Chain With Digital-Assisted DC-Offset Calibration for Ultra-Wideband", IEEE Journal of Solid-State Circuits, vol. 45, No. 2, Feb. 2010, pp. 338-350.

* cited by examiner

400

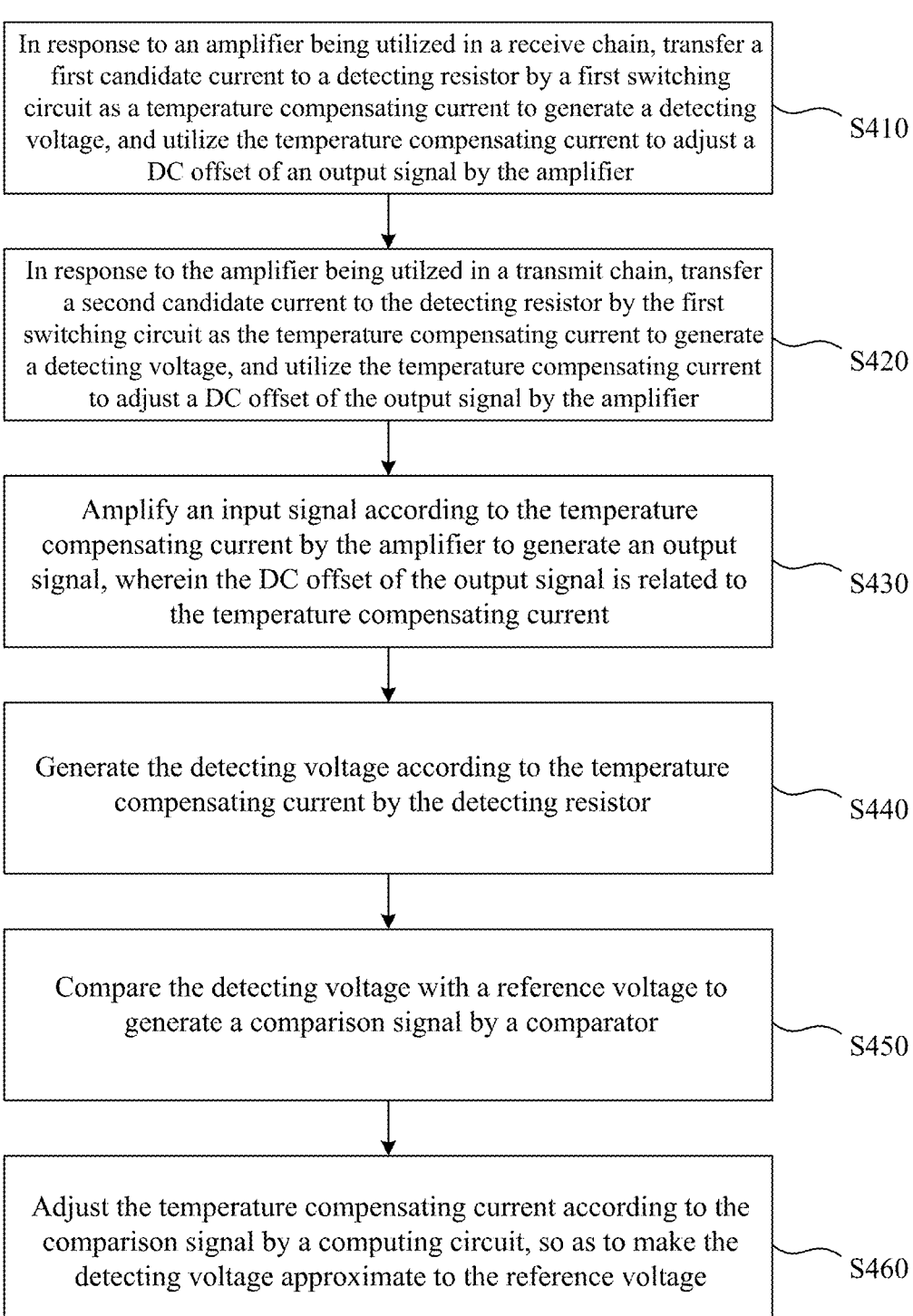

In response to an amplifier being utilized in a receive chain, transfer a first candidate current to a detecting resistor by a first switching circuit as a temperature compensating current to generate a detecting voltage, and utilize the temperature compensating current to adjust a DC offset of an output signal by the amplifier ⟿ S410

In response to the amplifier being utilzed in a transmit chain, transfer a second candidate current to the detecting resistor by the first switching circuit as the temperature compensating current to generate a detecting voltage, and utilize the temperature compensating current to adjust a DC offset of the output signal by the amplifier ⟿ S420

Amplify an input signal according to the temperature compensating current by the amplifier to generate an output signal, wherein the DC offset of the output signal is related to the temperature compensating current ⟿ S430

Generate the detecting voltage according to the temperature compensating current by the detecting resistor ⟿ S440

Compare the detecting voltage with a reference voltage to generate a comparison signal by a comparator ⟿ S450

Adjust the temperature compensating current according to the comparison signal by a computing circuit, so as to make the detecting voltage approximate to the reference voltage ⟿ S460

Fig. 4

SIGNAL PROCESSING DEVICE AND OPERATING METHOD THEREOF

RELATED APPLICATIONS

This application claims priority to Taiwan Application Serial Number 112147716, filed Dec. 7, 2023, which is herein incorporated by reference.

BACKGROUND

Technical Field

The present disclosure relates to the signal processing technology, and in particular, to a signal processing device for saving operating time and an operating method thereof.

Description of Related Art

An amplifier is widely used in a receiving (Rx) path or transmitting (Tx) path of a signal. A leakage current at an input terminal of the amplifier may affect a DC offset of an output signal of the amplifier, resulting in signal distortion. Therefore, chips on the market usually perform DC offset correction for a gain of each stage of the amplifier, and store voltage or current parameters suitable for subsequent operation based on a correction result. However, because the electronic characteristics of the amplifier change in real time with the operating temperature, the pre-stored parameters cannot effectively compensate for the DC offset variation of the amplifier.

SUMMARY

The present disclosure provides a signal processing device including a circuit system, in which the circuit system includes an amplifier, a temperature compensating circuit and a computing circuit. The amplifier is configured to amplify an input signal according to a temperature compensating current, in order to generate an output signal. A DC offset of the output signal is related to the temperature compensating current. The temperature compensating circuit includes a detecting resistor and a comparator. The detecting resistor is configured to generate a detecting voltage according to the temperature compensating current. The comparator is configured to compare the detecting voltage with a reference voltage to generate a comparison signal. The computing circuit is configured to adjust the temperature compensating current according to the comparison signal so as to make the detecting voltage approximate to the reference voltage.

The present disclosure provides an operating method, applicable to the signal processing device. The signal processing device includes a circuit system, and the circuit system includes an amplifier, a temperature compensating circuit and a computing circuit. The operating method includes: utilizing the amplifier to amplify an input signal of the amplifier according to a temperature compensating current, where a DC offset of an output signal of the amplifier is related to the temperature compensating current; utilizing a detecting resistor of the temperature compensating circuit to generate a detecting voltage according to the temperature compensating current; utilizing a comparator of the temperature compensating circuit to compare the detecting voltage with a reference voltage to generate a comparison signal; and utilizing the computing circuit to adjust the temperature compensating current according to the comparison signal so as to make the detecting voltage approximate to the reference voltage.

The signal processing device and the operating method have the advantages of saving operating time and having high temperature adaptability.

BRIEF DESCRIPTION OF THE DRAWINGS

FIG. 4 is a flowchart of an operating method according to an embodiment of the present disclosure.

DETAILED DESCRIPTION

Figure 1:
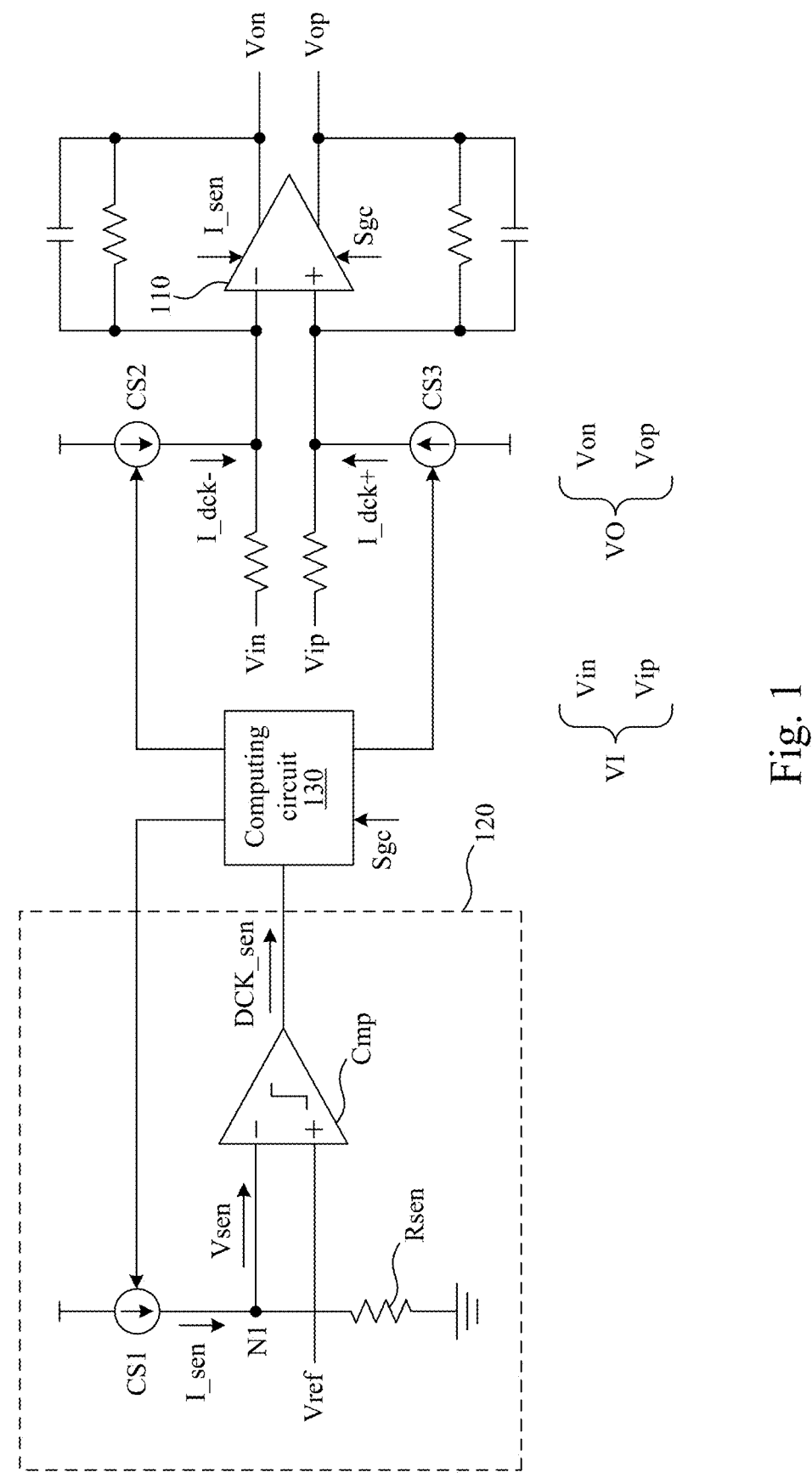
FIG. 1 is a simplified function block diagram of a circuit system according to an embodiment of the present disclosure.

Embodiments of the present disclosure are illustrated below in combination with related figures. In the figures, the same reference numerals represent the same or similar elements or method flows.

FIG. 1 is a simplified function block diagram of a circuit system 100 according to an embodiment of the present disclosure. The circuit system 100 includes an amplifier 110, a temperature compensating circuit 120 and a computing circuit 130. The amplifier 110 is configured to amplify an input signal VI according to a temperature compensating current I_sen, in order to generate an output signal VO. A DC offset of the output signal VO is related to the temperature compensating current I_sen. In some embodiments, the input signal VI is a differential signal and includes an inverting input signal Vin and a non-inverting input signal Vip, and the output signal VO is a differential signal and includes an inverting output signal Von and a non-inverting output signal Vop. However, the present disclosure is not limited thereto. The DC offset of the output signal VO refers to a difference obtained by subtracting the inverting output signal Von from the non-inverting output signal Vop.

The temperature compensating circuit 120 includes a detecting resistor Rsen, a comparator Cmp and a first current source CS1, where the first current source CS1 is configured to generate a temperature compensating current I_sen. The detecting resistor Rsen is coupled in series with the first current source CS1, and a first node N1 is provided between the detecting resistor Rsen and the first current source CS1. The detecting resistor Rsen is configured to generate a detecting voltage Vsen in the first node N1 according to the temperature compensating current I_sen, for example, when the temperature compensating current I_sen flows through the detecting resistor Rsen, the detecting voltage Vsen is generated in the first node N1. A first input terminal (e.g., an inverting input terminal) of the comparator Cmp is coupled with the first node N1 to receive the detecting voltage Vsen. A second input terminal (e.g., a non-inverting input terminal) of the comparator Cmp is configured to receive a reference voltage Vref. In some embodiments, the reference voltage Vref is a bandgap reference voltage that does not change with the temperature. The comparator Cmp is configured to compare the detecting voltage Vsen with the reference voltage Vref to generate a comparison signal DCK_sen.

The computing circuit 130 is configured to adjust the temperature compensating current I_sen according to the comparison signal DCK_sen, so that the detecting voltage Vsen approaches the reference voltage Vref. Specifically, when the computing circuit 130 determines that the detecting voltage Vsen is not equal to the reference voltage Vref according to the comparison signal DCK_sen, the computing circuit 130 can sequentially increases or decreases the temperature compensating current I_sen, until the detecting voltage Vsen is approximately equal to the reference voltage Vref.

The circuit system 100 further includes a second current source CS2 and a third current source CS3. The second current source CS2 and the third current source CS3 are respectively configured to generate a first gain compensating current I_dck− and a second gain compensating current I_dck+. The first input terminal (e.g., the inverting input terminal) and the second input terminal (e.g., the non-inverting input terminal) of the amplifier 110 are respectively configured to receive the inverting input signal Vin and the non-inverting input signal Vip, and are respectively configured to receive the first gain compensating current I_dck− and the second gain compensating current I_dck+. The DC offset of the output signal VO of the amplifier 110 is related to the first gain compensating current I_dck− and the second gain compensating current I_dck+. The amplifier 110 is further configured to adjust the gain of the amplifier 110 according to a gain control signal Sgc. The gain control signal Sgc is also transferred to the computing circuit 130, so that the computing circuit 130 correspondingly adjusts the first gain compensating current I_dck− and the second gain compensating current I_dck+ according to the gain control signal Sgc.

For example, the amplifier 110 can be implemented by a Transimpedance amplifier (TIA for short), and is provided in a receive chain of a data receiving terminal (i.e., an Rx terminal). For one or more stages of gains in the amplifier 110 (such as each stage of gain), the computing circuit 130 can decide and record the first gain compensating current I_dck− and the second gain compensating current I_dck+ of appropriate magnitudes according to the signal strength (for example, a received signal strength index, RSSI for short), so as to realize the DC offset correction of the output signal VO. After the correction, when the amplifier 110 changes the gain according to the gain control signal Sgc, the computing circuit 130 can correspondingly adjust the first gain compensating current I_dck− and the second gain compensating current I_dck+ to appropriate magnitudes according to the gain control signal Sgc.

In some embodiments, the temperature of the circuit system 100 may affect element characteristics of the second current source CS2 and the third current source CS3, so as to reduce the effect of the DC offset correction. In view of the above, by cooperating with the temperature compensating circuit 120, the computing circuit 130 can continuously detect the effect of the temperature on the first current source CS1, to adjust the magnitude of the temperature compensating current I_sen in real time. In some embodiments, the amplifier 110 includes a differential output pair (not shown) configured to generate the output signal VO, and the temperature compensating current I_sen is utilized as part of a bias current of the differential output pair. Therefore, by adjusting the temperature compensating current I_sen in real time, the DC offset of the output signal VO due to temperature changes is compensated in real time.

In other words, the first gain compensating current I_dck− and the second gain compensating current I_dck+ are configured to perform coarse compensation on the DC offset of the output signal VO, and the temperature compensating current I_sen is configured to perform fine compensation on the DC offset of the output signal VO.

Figure 2:
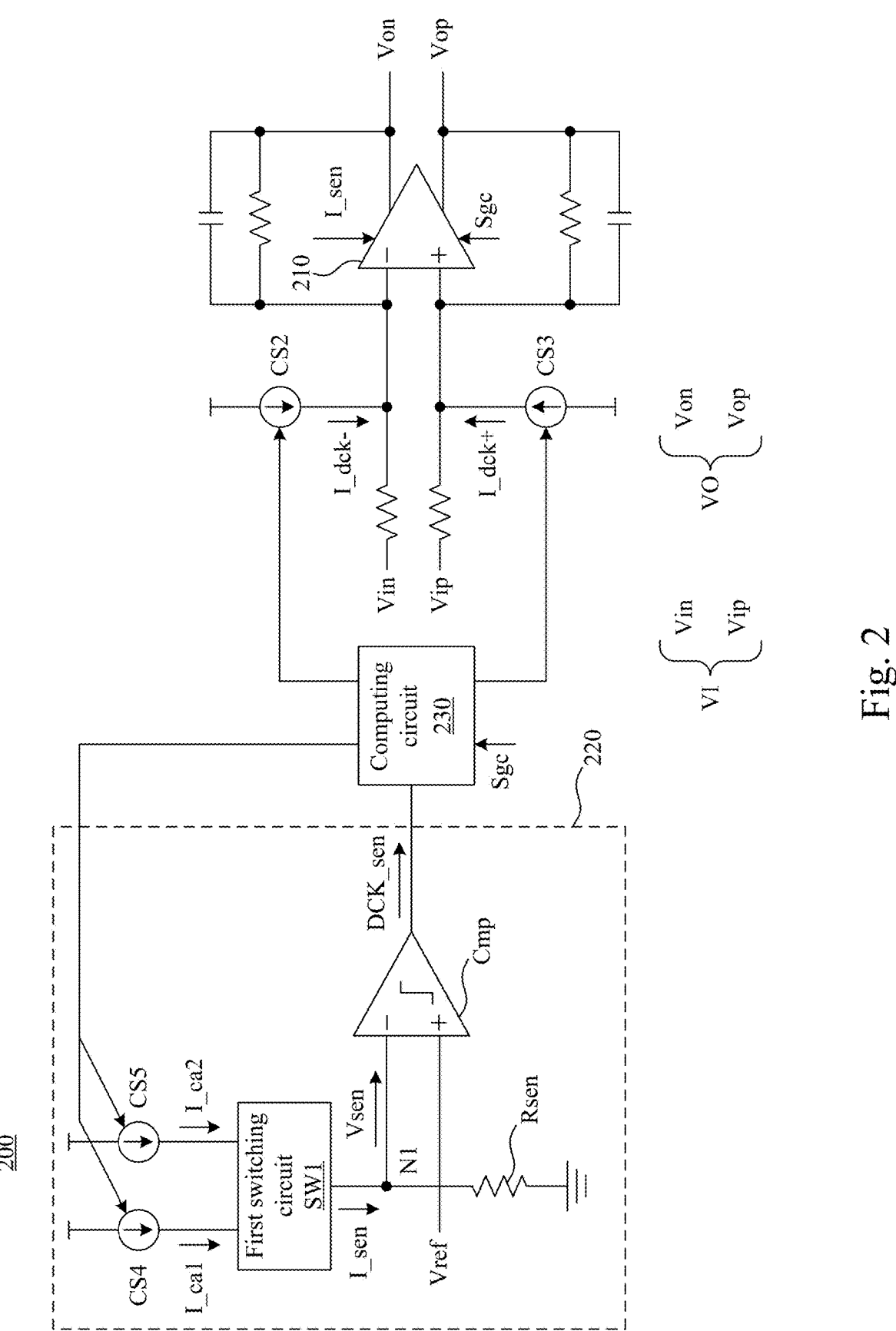
FIG. 2 is a simplified function block diagram of a circuit system according to an embodiment of the present disclosure.

FIG. 2 is a simplified function block diagram of a circuit system 200 according to an embodiment of the present disclosure. The circuit system 200 includes an amplifier 210, a temperature compensating circuit 220 and a computing circuit 230. The circuit system 200 is similar to the circuit system 100 in FIG. 1, and only the differences therebetween are illustrated below. The temperature compensating circuit 220 differs from the temperature compensating circuit 120 in FIG. 1 in that the temperature compensating circuit 220 replaces the first current source CS1 with a first switching circuit SW1, a fourth current source CS4 and a fifth current source CS5, in which the fourth current source CS4 is configured to generate a first candidate current I_ca1, the fifth current source CS5 is configured to generate a second candidate current I_ca2, and the first candidate current I_ca1 is different from the second candidate current I_ca2. In some embodiments, the first candidate current I_ca1 and the second candidate current I_ca2 have different temperature coefficients.

The first switching circuit SW1 is coupled with the fourth current source CS4, the fifth current source CS5 and the detecting resistor Rsen, and is configured to transfer one of the first candidate current I_ca1 and the second candidate current I_ca2 as the temperature compensating current I_sen to the detecting resistor Rsen, so that the detecting resistor Rsen generates the detecting voltage Vsen in the first node N1. The amplifier 210 utilizes the one (i.e., the temperature compensating current I_sen) of the first candidate current I_ca1 and the second candidate current I_ca2 to adjust the DC offset of the output signal VO. In other words, the detecting resistor Rsen and the amplifier 210 receive the same first candidate current I_ca1, or receive the same second candidate current I_ca2.

The computing circuit 230 is switched to the first switching circuit SW1 according to the operating state of the circuit system 200 to output the first candidate current I_ca1 or the second candidate current I_ca2. The operating state is, for example, applying the computing circuit 230 to the receive chain or applying the computing circuit 230 to a transmit chain illustrated in FIG. 3. However, the present disclosure is not limited thereto. The computing circuit 230 may adjust the magnitudes of the first candidate current I_ca1 or the second candidate current I_ca2, so that the detecting voltage Vsen approaches the reference voltage Vref, and the adjustment mode thereof is similar to the mode of adjusting the magnitude of the temperature compensating current I_sen described in FIG. 1, and the description is not repeated here. In summary, the circuit system 200 can adjust the compensation direction and/or degree of the DC offset according to the current operating state, to adapt to different temperature change scenarios for different uses.

In some embodiments, the amplifier 210 includes a differential output pair (not shown) configured to generate the output signal VO, and the first candidate current I_ca1 or the second candidate current I_ca2 (i.e., the temperature compensating current I_sen) received by the amplifier 210 is utilized as part of a bias current of the differential output pair.

Figure 3:
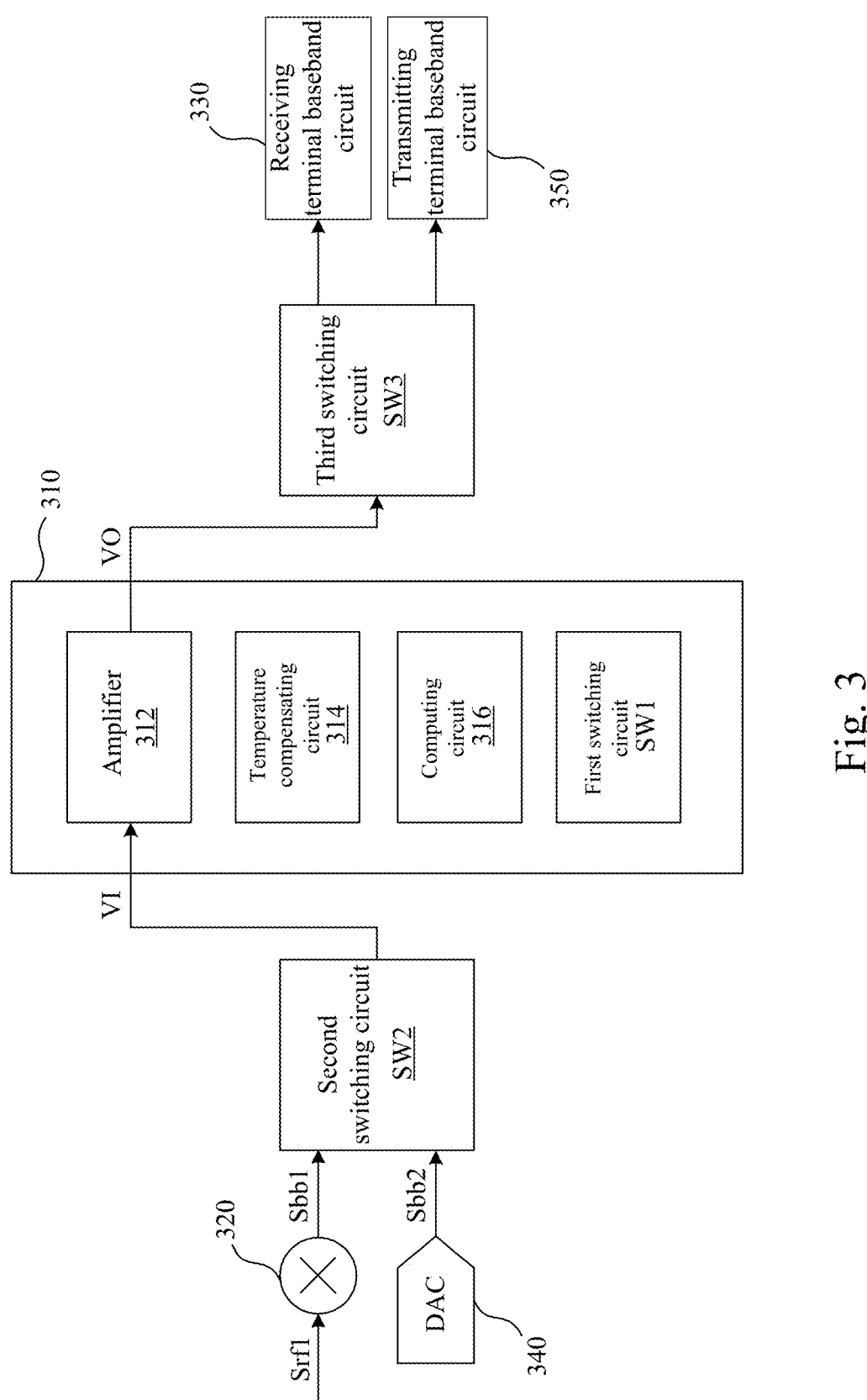
FIG. 3 is a simplified function block diagram of a signal processing device according to an embodiment of the present disclosure.

FIG. 3 is a simplified function block diagram of a signal processing device 300 according to an embodiment of the present disclosure. The signal processing device 300 includes a second switching circuit SW2, a third switching circuit SW3, a circuit system 310, a frequency mixer 320, a receiving terminal baseband circuit 330, a digital-to-analog conversion circuit (DAC) 340 and a transmitting terminal baseband circuit 350. The circuit system 310 includes an amplifier 312, a temperature compensating circuit 314, a computing circuit 316 and a first switching circuit SW1. The circuit system 310 can be implemented by the circuit system 200 in FIG. 2, that is, the amplifier 312, the temperature compensating circuit 314, the computing circuit 316 and the first switching circuit SW1 are respectively similarly to the amplifier 210, the temperature compensating circuit 220, the computing circuit 230 and the first switching circuit SW1 in FIG. 2. For the sake of brevity, it is not repeated here.

In some embodiments, the signal processing device 300 operates in a time-domain duplexing (TDD) mode. Therefore, the receive chain and the transmit chain of the signal processing device 300 can share the amplifier 312 so as to save circuit area. The receive chain refers to a path from the frequency mixer 320 to the receiving terminal baseband circuit 330, and the transmit chain refers to a path from the DAC 340 to the transmitting terminal baseband circuit 350.

FIG. 4 is a flowchart of an operating method 400 according to an embodiment of the present disclosure. The operating method 400 is applicable to the signal processing device 300. Any combination of the features of the operating method 400 can be implemented by a plurality of instructions stored in a non-transient computer readable medium. When the instructions are executed by one or more processors, the instructions make some or all steps of the operating method 400 be executed. It should be understood that the operating method 400 may include more or less steps than shown in the flowchart, and the steps in operating method 400 can be executed in any appropriate order.

In step S410, in response to the amplifier 312 being utilized for the receive chain, the first switching circuit SW1 transfers the first candidate current I_ca1 to the detecting resistor Rsen as the temperature compensating current I_sen, so that the detecting resistor Rsen generates a detecting voltage Vsen, and the amplifier 312 may utilize the temperature compensating current I_sen to adjust the DC offset of the output signal VO. In this case, the first frequency mixer 320 receives a first radio-frequency signal Srf1, and converts the first radio-frequency signal Srf1 into a first baseband signal Sbb1. The first frequency mixer 320 is further configured to transmit the first baseband signal Sbb1 to the second switching circuit SW2. Then, the second switching circuit SW2 outputs the first baseband signal Sbb1 as the input signal VI to the amplifier 312. The amplifier 312 amplifies the input signal VI to generate the output signal VO, and the amplifier 312 may utilize the temperature compensating current I_sen to adjust the DC offset of the output signal VO. Then, the third switching circuit SW3 receives the output signal VO from the amplifier 312, and transfers the output signal VO to the receiving terminal baseband circuit 330, so that the receiving terminal baseband circuit 330 filters the output signal VO. In some embodiments, the receiving terminal baseband circuit 330 includes a filter.

In step S420, in response to the amplifier 312 being utilized for the transmit chain, the first switching circuit SW1 transfers the second candidate current I_ca2 to the detecting resistor Rsen as the temperature compensating current I_sen, so that the detecting resistor Rsen generates a detecting voltage Vsen, and the amplifier 312 may utilize the temperature compensating current I_sen to adjust the DC offset of the output signal VO of the amplifier 312. The DAC 340 transmits a second baseband signal Sbb2 to the second switching circuit SW2. Then, the second switching circuit SW2 outputs the second baseband signal Sbb2 as the input signal VI to the amplifier 312. The amplifier 312 amplifies the input signal VI to generate the output signal VO, and the amplifier 312 may utilize the temperature compensating current I_sen to adjust the DC offset of the output signal VO. Then, the third switching circuit SW3 receives the output signal VO from the amplifier 312, and transfers the output signal VO to the transmitting terminal baseband circuit 350, so that the transmitting terminal baseband circuit 350 filters the output signal VO. In some embodiments, the transmitting terminal baseband circuit 350 includes a filter.

In step S430, the amplifier 312 amplifies the input signal VI according to the received first candidate current I_ca1 or the second candidate current I_ca2 (i.e., the temperature compensating current I_sen) to generate the output signal VO. The DC offset of the output signal VO of the amplifier 312 is related to the first candidate current I_ca1 or the second candidate current I_ca2 (i.e., the temperature compensating current I_sen) received by the amplifier 312. The DC offset of the output signal VO is further related to the first gain compensating current I_dck− and the second gain compensating current I_dck+. Similar to the content described in FIG. 1 and FIG. 2, a first input terminal and a second input terminal of the amplifier 312 receive the input signal VI, the first gain compensating current I_dck− and the second gain compensating current I_dck+. The amplifier 312 is further configured to adjust the gain of the amplifier 312 according to the gain control signal Sgc. The computing circuit 316 adjusts the first gain compensating current I_dck− and the second gain compensating current I_dck+ according to the gain control signal Sgc, so as to adaptively compensate for a DC offset change of the output signal VO for the current gain of the amplifier 312.

In step S440, similar to the content described in FIG. 1 and FIG. 2, the detecting resistor Rsen of the temperature compensating circuit 314 generates the detecting voltage Vsen according to the received first candidate current I_ca1 or the second candidate current I_ca2 (i.e., the temperature compensating current I_sen).

In step S450, similar to the content described in FIG. 1 and FIG. 2, the comparator Cmp of the temperature compensating circuit 314 compares the detecting voltage Vsen with the reference voltage Vref to generate a comparison signal DCK_sen.

In step S460, similar to the content described in FIG. 1 and FIG. 2, according to the comparison signal DCK_sen, the computing circuit 316 adjusts the first candidate current I_ca1 or the second candidate current I_ca2 (i.e., the temperature compensating current I_sen) received by the detecting resistor Rsen, so that the detecting voltage Vsen approaches the reference voltage Vref.

In some embodiments, the transmit chain of the signal processing device 300 can be omitted, that is, the DAC 340, the second switching circuit SW2, the third switching circuit SW3 and the transmitting terminal baseband circuit 350 can be omitted. In this case, the frequency mixer 320 and the receiving terminal baseband circuit 330 are coupled with amplifier 312, and step S420 can be omitted in the operating method 400.

In some embodiments, the receive chain of the signal processing device 300 can be omitted, that is, the frequency mixer 320, the receiving terminal baseband circuit 330, the second switching circuit SW2 and the third switching circuit SW3 can be omitted. In this case, the DAC 340 and the transmitting terminal baseband circuit 350 are coupled with the amplifier 312, and step S410 can be omitted in the operating method 400.

In some embodiments, steps S430-S460 can be executed at the same time as step S410 or S420.

In conclusion, when the operating temperature changes, the circuit systems 100-200, the signal processing device 300 and the operating method 400 can adjust the DC offset in real time by the temperature compensating current I_sen, and there is no need to recorrect the first gain compensating current I_dck– and the second gain compensating current I_dck+ for each stage of gain when the temperature changes. Therefore, the circuit systems 100-200, the signal processing device 300 and the operating method 400 have the advantages of saving the operating time and having high temperature adaptability.

The expressions "about", "approximately" or "roughly" used herein generally means that the error or range of an index value is usually within 20%, preferably within 10%, and more preferably within 5%. Unless expressly stated, the values mentioned are regarded as approximate values, i.e., the error or range represented by, such as "about", "approximately" or "roughly".

Some terms are used in the description and claims to refer to specific elements. However, those skilled in the art should understand that the same element may be referred to by different terms. The description and the claims are not based on the difference in name as a way to distinguish elements, but rather on the difference in function of the elements. The "including" mentioned in the description and the claims is an open term, so it should be interpreted as "including, but not limited to". In addition, "coupling" includes any direct and indirect means of connection. Therefore, if it is described that the first element is coupled with the second element, it means that the first element can be directly connected to the second element through electrical connection or wireless transmission, optical transmission and other signal connection methods, or indirectly connected to the second element by other elements or connection means.

The description of "and/or" used herein includes any combination of one or more of the items listed. In addition, unless otherwise specified in the description, any singular term includes plural meanings.

The above are only preferred embodiments of the present disclosure, and any modification and equalization change can be performed on the present disclosure, without departing from the scope or spirit of the present disclosure. In summary, all modifications and equivalent changes made to the present disclosure within the scope of the following claims fall within the scope of the present disclosure.

What is claimed is:

1. A signal processing device, comprising a circuit system, wherein the circuit system comprises:
  an amplifier, configured to amplify an input signal according to a temperature compensating current for generating an output signal, wherein a direct current offset of the output signal is related to the temperature compensating current; and
  a temperature compensating circuit, comprising:
  a detecting resistor, configured to generate a detecting voltage according to the temperature compensating current; and
  a comparator, configured to compare the detecting voltage with a reference voltage to generate a comparison signal; and
  a computing circuit, configured to adjust the temperature compensating current according to the comparison signal so as to make the detecting voltage approximate to the reference voltage.

2. The signal processing device according to claim 1, wherein a first input terminal and a second input terminal of the amplifier are configured to receive the input signal, a first gain compensating current and a second gain compensating current, wherein the direct current offset of the output signal of the amplifier is related to the first gain compensating current and the second gain compensating current, and
  wherein the amplifier is configured to adjust a gain of the amplifier according to a gain control signal, and the computing circuit is configured to adjust the first gain compensating current and the second gain compensating current according to the gain control signal.

3. The signal processing device according to claim 1, wherein the reference voltage is a bandgap reference voltage.

4. The signal processing device according to claim 1, further comprising:
  a frequency mixer coupled with the amplifier, and the frequency mixer being configured to convert a first radio-frequency signal into a first baseband signal and configured to output the first baseband signal as the input signal to the amplifier; and
  a receiving terminal baseband circuit coupled with the amplifier, and the receiving terminal baseband circuit being configured to filter the output signal.

5. The signal processing device according to claim 1, further comprising:
  a digital-to-analog converter coupled with the amplifier, and the digital-to-analog converter being configured to output a second baseband signal and configured to output the second baseband signal as the input signal to the amplifier; and
  a transmitting terminal baseband circuit coupled with the amplifier, and the transmitting terminal baseband circuit being configured to filter the output signal.

6. The signal processing device according to claim 1, wherein the temperature compensating circuit further comprises:
  a first switching circuit coupled with the detecting resistor, and the first switching circuit being configured to transfer one of a first candidate current and a second candidate current as the temperature compensating current to the detecting resistor, so that the detecting resistor generates the detecting voltage,
  wherein the amplifier utilizes the one of the first candidate current and the second candidate current to adjust the direct current offset of the output signal of the amplifier, and
  wherein the first candidate current is different from the second candidate current.

7. The signal processing device according to claim 6, wherein the first candidate current and the second candidate current have different temperature coefficients.

8. The signal processing device according to claim 6, further comprising:
  a frequency mixer;
  a transmitting terminal baseband circuit;
  a receiving terminal baseband circuit;
  a digital-to-analog converter;
  a second switching circuit coupled with the amplifier and configured to transfer the input signal to the amplifier; and
  a third switching circuit coupled with the amplifier and configured to receive the output signal,
  wherein in response to that the first switching circuit transfers the first candidate current as the temperature compensating current to the detecting resistor, the second switching circuit outputs a first baseband signal generated by the frequency mixer as the input signal, and the third switching circuit transfers the output signal to the receiving terminal baseband circuit, and wherein in response to that the first switching circuit transfers the second candidate current as the temperature compensating current to the detecting resistor, the second switching circuit outputs a second baseband signal generated by the digital-to-analog converter as the input signal, and the third switching circuit transfers the output signal to the transmitting terminal baseband circuit.

9. The signal processing device according to claim 1, wherein the amplifier is a transimpedance amplifier.

10. An operating method applicable to a signal processing device, wherein the signal processing device comprises a circuit system, and the circuit system comprises an amplifier, a temperature compensating circuit and a computing circuit, and the operating method comprises:

utilizing the amplifier to amplify an input signal of the amplifier according to a temperature compensating current, wherein a direct current offset of an output signal of the amplifier is related to the temperature compensating current;

utilizing a detecting resistor of the temperature compensating circuit to generate a detecting voltage according to the temperature compensating current;

utilizing a comparator of the temperature compensating circuit to compare the detecting voltage with a reference voltage to generate a comparison signal; and utilizing the computing circuit to adjust the temperature compensating current according to the comparison signal so as to make the detecting voltage approximate to the reference voltage.

11. The operating method according to claim 10, wherein utilizing the amplifier to amplify the input signal of the amplifier according to the temperature compensating current to generate the output signal comprises:

utilizing a first input terminal and a second input terminal of the amplifier to receive the input signal, a first gain compensating current and a second gain compensating current, wherein the direct current offset of the output signal is related to the first gain compensating current and the second gain compensating current;

utilizing the amplifier to adjust a gain of the amplifier according to a gain control signal; and utilizing the computing circuit to adjust the first gain compensating current and the second gain compensating current according to the gain control signal.

12. The operating method according to claim 10, wherein the reference voltage is a bandgap reference voltage.

13. The operating method according to claim 10, wherein the signal processing device further comprises a frequency mixer and a receiving terminal baseband circuit, wherein the operating method further comprises:

utilizing the frequency mixer to convert a first radio-frequency signal into a first baseband signal, wherein the first baseband signal is outputted to the amplifier as the input signal; and utilizing the receiving terminal baseband circuit to filter the output signal.

14. The operating method according to claim 10, wherein the signal processing device further comprises a digital-to-analog converter and a transmitting terminal baseband circuit, wherein the operating method further comprises:

utilizing the digital-to-analog converter to generate a second baseband signal, wherein the second baseband signal is outputted to the amplifier as the input signal; and utilizing the transmitting terminal baseband circuit to filter the output signal.

15. The operating method according to claim 10, wherein the signal processing device further comprises a first switching circuit, and the operating method further comprises:

in response to that the first switching circuit transfers one of a first candidate current and a second candidate current as the temperature compensating current to the detecting resistor, so that the detecting resistor generates the detecting voltage, utilizing, by the amplifier, the one of the first candidate current and the second candidate current to adjust the direct current offset of the output signal of the amplifier, and wherein the first candidate current is different from the second candidate current.

16. The operating method according to claim 15, wherein the first candidate current and the second candidate current have different temperature coefficients.

17. The operating method according to claim 15, wherein the signal processing device further comprises a frequency mixer, a receiving terminal baseband circuit, a transmitting terminal baseband circuit, a digital-to-analog converter, a second switching circuit and a third switching circuit, the second switching circuit and the third switching circuit are coupled with the amplifier, wherein the operating method further comprises:

in response to that the first switching circuit transfers the first candidate current as the temperature compensating current to the detecting resistor:

utilizing the second switching circuit to output a first baseband signal generated by the frequency mixer as the input signal; and utilizing the third switching circuit to transfer the output signal to the receiving terminal baseband circuit; and in response to that the first switching circuit transfers the second candidate current as the temperature compensating current to the detecting resistor:

utilizing the second switching circuit to output a second baseband signal generated by the digital-to-analog converter as the input signal; and utilizing the third switching circuit to transfer the output signal to the transmitting terminal baseband circuit.

18. The operating method according to claim 10, wherein the amplifier is a transimpedance amplifier.

* * * * *